UNITED STATES PATENT OFFICE.

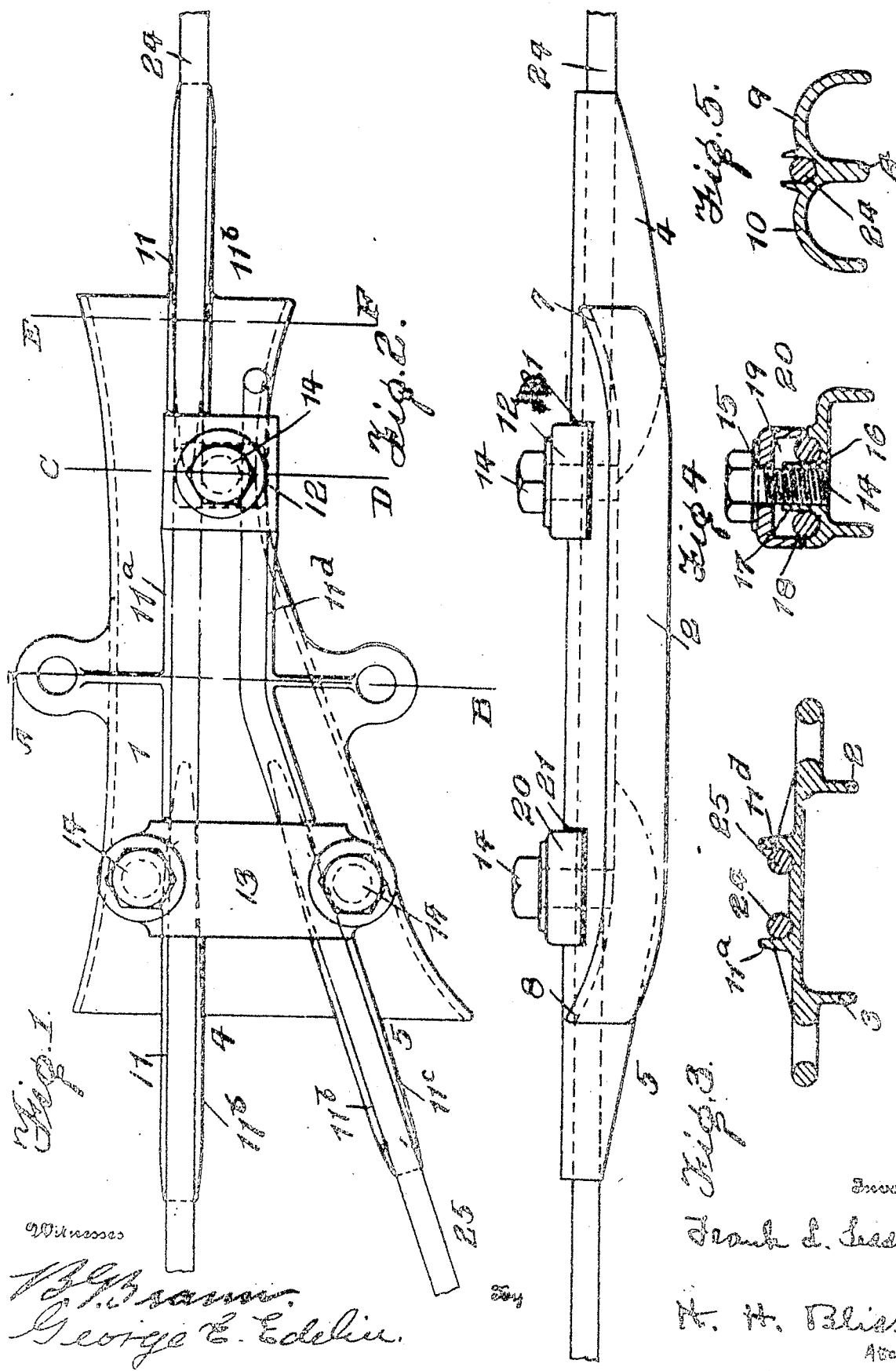

FRANK L. SESSIONS, OF COLUMBUS, OHIO, ASSIGNOR TO THE JEFFREY MANUFACTURING COMPANY, OF COLUMBUS, OHIO, A CORPORATION OF OHIO.

TROLLEY-SWITCH.

962,533.   Specification of Letters Patent.   Patented June 28, 1910.

Application filed May 5, 1908. Serial No. 431,012.

*To all whom it may concern:*

Be it known that I, FRANK L. SESSIONS, a citizen of the United States, residing at Columbus, in the county of Franklin and State of Ohio, have invented certain new and useful Improvements in Trolley-Switches, of which the following is a specification, reference being had therein to the accompanying drawing.

This invention relates to switching or crossing devices for trolley wires, and has for its object to provide a switch which can be secured at any desired point along a straight main wire, and which can be readily and firmly secured to such main wire and to a branching or cross wire.

Figure 1 is a top plan view of a trolley switching device embodying my invention, shown attached to the trolley wires. Fig. 2 is a side elevation of the same. Figs. 3, 4 and 5 are cross sectional views, respectively, taken along the lines a—b, c—d, and e—f.

The switch plate as an entirety is indicated by 1, it being approximately triangular in shape and formed with the downwardly projecting edge flanges 2 and 3 and with the depending wheel depressing ribs 4, 5 and 6. These flanges and ribs may be of the common construction and serve to guide the under-running trolley wheel smoothly from either trolley under-wire to the side of the switch plate, and vice versa.

The ends of the plate are turned upward, as shown at 7 and 8 to assist in effecting the passage of the wheel from the wire to the plate or from the plate to the wire without shock or jar. These upturned ends are of the arched form shown at 9 and 10 at the sides of the guiding rib 4, this shape assisting in centering the trolley wheel with respect to the plate.

On the upper surface of the plate there are ribs which form seats for the trolley wires. One of these is shown at 11—11ᵃ lying on the outside of the main wire or line wire 24. Opposed to the parts 11—11ᵃ of the rib there are short inside ribs at 11ᵇ. For the switch wire 25 there is a rib having the parts 11ᶜ and 11ᵈ, which lie outside of this wire. The seat for the wire 24 is practically rectilinear, this main wire extending across the top of the plate in substantially straight lines. The switching device is so designed that it can be applied at any desired point along a straight line wire without necessitating the bending of the wire either vertically or laterally at the time of attachment, or subsequently requiring it to be straightened if the position of the switch is changed. The switch wire 25 approaches the plate at an inclination, and then curves around and lies close to the rib sections 11ᶜ—11ᵈ.

The wires are secured to the switch plate by the clamping blocks 12 and 13. 14—14 are screw bolts which pass through the apertures 15 in the clamping devices and engage with threaded cavities at 16 in the plate. To provide a prolonged engagement between the bolt and the switch plate the latter is cast with the bosses or projections 17 extending upward from the plate at the point where the screw bolts engage.

The clamping blocks have the flanges or projections 19 transverse to the wires preferably formed with recesses 18 into which the wires can fit, and also have the flanges or projections 20 which are adapted to engage with the outer sides of the wires. The clamps are forced down by the bolts against the wires. The plate carries stops or abutments for the clamps supplemental to the bolts or binding devices. To provide such stops or abutments, the wire-holding ribs can be recessed or formed with shoulders at 21, as shown. Such stops or shoulders act to relieve the screw bolts of much of the stress resulting from the tension of the wires.

I provide for the switch wire 25 a long and firm connection with the plate, inasmuch as it is carried around the ribs 11ᶜ and 11ᵈ far enough to be clamped by the block 13. Each of the blocks 12 and 13 engages with both the main wire and the switch wire, the block 13 being made sufficiently long to reach from one of the wires across to the other. The flanges or projections 20 lying outside of the wires, the latter serve to hold them against lateral displacement.

What I claim is:—

1. A trolley switching or crossing device having a plate, a rectilineal wire seat on top of the plate, a threaded binding device engaging with the plate, and a wire clamping device between the threaded binding device and the plate, the said clamp having a side and two end depending flanges, the side flange being adapted to engage the wire along one side, and the end flanges being adapted to engage the top of the wire, substantially as set forth.

2. The combination of a rectilineal main wire, a switching device comprising a plate adapted to be secured along its top to the main wire and having an upward extending rib one part of which is parallel to the main wire and another part of which lies at an acute angle to the main wire, a branch wire engaging with the upward extending rib on the side adjacent the main wire, and a clamping device for the said branch wire to engage it at a point beyond the part of the rib which is parallel to the main wire, substantially as set forth.

3. The combination of a main wire, a switching device comprising a plate, means for securing the plate at its upper side to the main wire, an upward extending rib with its ends at an angle to each other, one of the ends extending away from the main wire at an angle thereto, a branch wire adapted to engage with the side of the said rib which is adjacent the main wire, and a clamping device to engage the branch wire at a point beyond the end of the rib, substantially as set forth.

4. The combination of a rectilineal main wire, a switching device comprising a plate, means for securing the plate at its upper side to the main wire, an upward extending rib with its ends at an angle to each other, one of the ends extending away from the main wire at an angle thereto, a branch wire adapted to engage with the said rib on the side adjacent the main wire, and clamping devices for the branch wire near each end of the rib, substantially as set forth.

5. In a trolley crossing or switching device a horizontal plate having upward extending ribs, one of the ribs having its ends at an angle to one another, one of the said ends extending away from the other rib at an angle thereto, two trolley wires each engaging one of the ribs on the side adjacent the other, and clamping devices adapted to hold the wires in engagement with the plate and ribs, substantially as set forth.

In testimony whereof I affix my signature, in presence of two witnesses.

FRANK L. SESSIONS.

Witnesses:
DUDLEY TYNG FISHER,
JAMES G. CHANDLER.